(12) United States Patent
Nocon et al.

(10) Patent No.: US 10,761,607 B2
(45) Date of Patent: Sep. 1, 2020

(54) MULTI-MODE HAPTIC EFFECTS DELIVERY SYSTEM

(71) Applicant: Disney Enterprises, Inc., Burbank, CA (US)

(72) Inventors: Nathan Nocon, Valencia, CA (US); Jonathan R. Hsu, Pomona, CA (US)

(73) Assignee: Disney Enterprises Inc., Burbank, CA (US)

( * ) Notice: Subject to any disclaimer, the term of this patent is extended or adjusted under 35 U.S.C. 154(b) by 0 days.

(21) Appl. No.: 16/106,673

(22) Filed: Aug. 21, 2018

(65) Prior Publication Data
US 2020/0064922 A1 Feb. 27, 2020

(51) Int. Cl.
*G06F 3/01* (2006.01)
*F41A 33/06* (2006.01)

(52) U.S. Cl.
CPC .............. *G06F 3/016* (2013.01); *F41A 33/06* (2013.01)

(58) Field of Classification Search
CPC ........ G06F 3/016; F41A 33/06; A63F 13/285; A63F 13/24; A63F 13/25
See application file for complete search history.

(56) References Cited

U.S. PATENT DOCUMENTS

| | | | |
|---|---|---|---|
| 2009/0316747 A1* | 12/2009 | Fine | G01N 33/22 374/45 |
| 2010/0283731 A1* | 11/2010 | Grant | G06F 3/016 345/158 |
| 2011/0157052 A1* | 6/2011 | Lee | G06F 1/1626 345/173 |
| 2017/0242486 A1* | 8/2017 | Grant | A63F 13/211 |
| 2018/0039302 A1* | 2/2018 | Levesque | G06F 1/1652 |

* cited by examiner

*Primary Examiner* — Kent W Chang
*Assistant Examiner* — Andrew Lee
(74) *Attorney, Agent, or Firm* — Farjami & Farjami LLP

(57) ABSTRACT

In one implementation, a multi-mode haptic effects delivery system includes an impact surface, a mass adjacent to the impact surface, and a driving mechanism configured to reciprocate the mass. The multi-mode haptic effects delivery system also includes a motor configured to generate a vibrational mode haptic effect. The driving mechanism configured to reciprocate the mass causes the mass to strike the impact surface so as to generate a recoil mode haptic effect. In one implementation, the driving mechanism is a gear assembly powered by the same motor used to generate the vibrational mode haptic effect.

18 Claims, 7 Drawing Sheets

MULTI-MODE HAPTIC EFFECTS DELIVERY SYSTEM

BACKGROUND

Interactive games, such as single and multi-player games, and those utilizing augmented reality (AR) and virtual reality (VR) experiences, for example, merge computer generated imagery with images of the real world in a way that provides a deeply immersive and stimulating sensory experience to a user. The interactive games may be even more enjoyable to a user when they include haptic feedback. However, many conventional haptic actuators used to provide haptic feedback are relatively primitive. For example, in many cases the haptic feedback produced by conventional haptic actuators is limited to homogenous buzzing type vibrations.

SUMMARY

There are provided multi-mode haptic effects delivery systems, substantially as shown in and/or described in connection with at least one of the figures, and as set forth more completely in the claims.

DETAILED DESCRIPTION

Figure 1A:
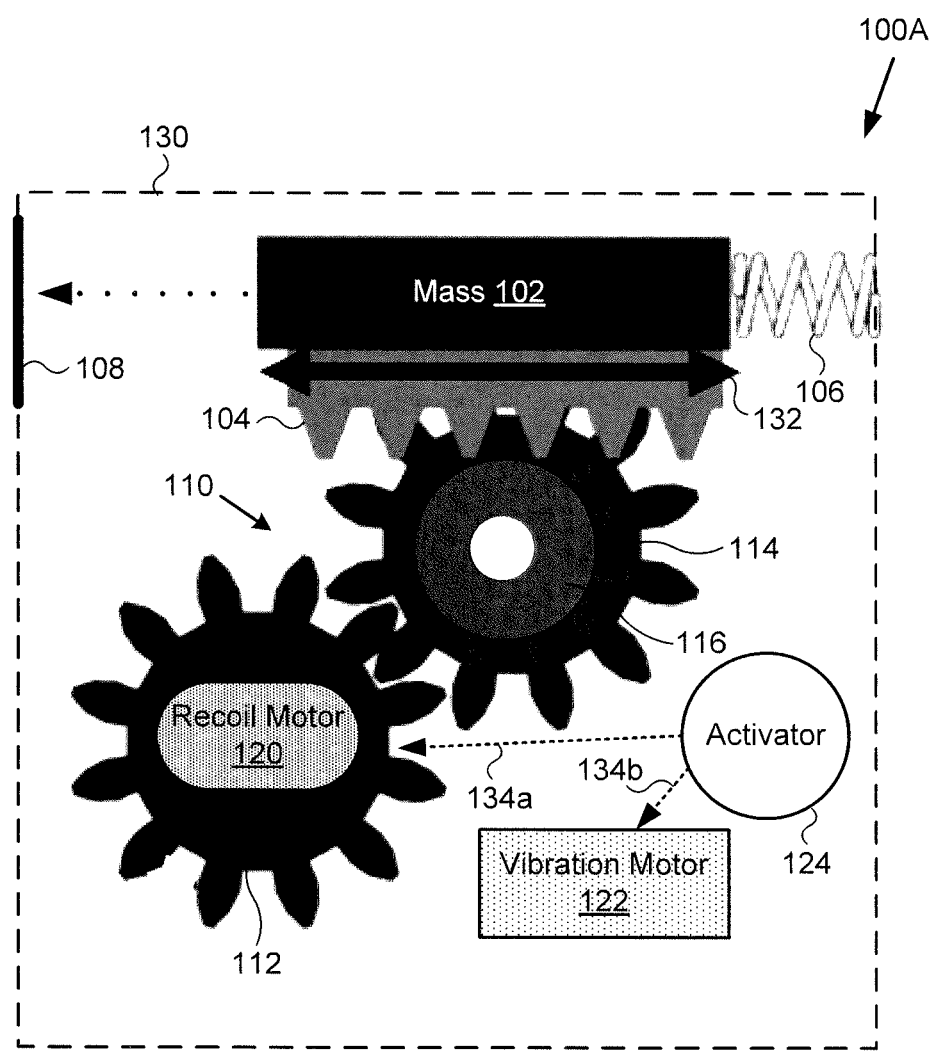
FIG. 1A shows a diagram of an exemplary multi-mode haptic effects delivery system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1A shows a diagram of exemplary multi-mode haptic effects delivery system 100A, according to one implementation. As shown in FIG. 1A, multi-mode haptic effects delivery system 100A includes casing or enclosure 130 having impact surface 108 and containing mass 102 adjacent to impact surface 108. Mass 102 is shown to be situated on shuttle 104, which, in some implementations, may be configured to move with mass 102.

As further shown in FIG. 1A, enclosure 130 also contains a driving mechanism configured to reciprocate shuttle 104 and/or mass 102. According to the present exemplary implementation, that driving mechanism includes spring 106 coupled to mass 102, and gear assembly 110 for compressing spring 106 so as to load spring 106. Gear assembly 110 of the driving mechanism includes master gear 112 driven by recoil motor 120, and slave gear 114 driven by master gear 112. It is noted that slave gear 114 includes half gear 116 for engaging and releasing shuttle 104. Also shown in FIG. 1A are vibration motor 122, and activator 124 providing recoil activation signal 134a to recoil motor 120 and providing vibration activation signal 134b to vibration motor 122.

Enclosure 130 may be a portion of a toy weapon, or may be integrated with a wearable item such as a vest, jacket, or glove, for example. In one implementation, for instance, enclosure 130 may be integrated with a toy weapon by forming a portion of a gun stock configured to deliver a recoil mode haptic effect through impact surface 108 in contact with a user's hand or shoulder. Thus, in various implementations, enclosure 130 may be substantially rigid, or may be semi-rigid or pliable but include one or more rigid elements, such as impact surface 108.

According to the implementation shown in FIG. 1A, multi-mode haptic effects delivery system 100A is configured to generate one or more recoil mode haptic effects using activator 124, recoil motor 120, the driving mechanism including gear assembly 110 and spring 106, and mass 102. For example, activator 124, which may be implemented as one or more buttons, and/or switches, and/or triggers selectable by a user of multi-mode haptic effects delivery system 100A, may generate recoil activation signal 134a in response to an input to activator 124 by the user (system user not shown in FIG. 1A).

Recoil activation signal 134a may cause recoil motor 120, which may be a unidirectional motor, for example, to turn master gear 112 of gear assembly 110 in a counter-clockwise direction. That counter-clockwise turning of master gear 112 results in slave gear 114 including half gear 116 turning clockwise to move shuttle 104 carrying mass 102 away from impact surface 108 and toward spring 106, thereby compressing spring 106 so as to load spring 106.

After approximately one half turn of slave gear 114, half gear 116 may release shuttle 104, resulting in mass 102 being impelled against impact surface 108 by spring 106 and then reciprocating along axis 132 substantially perpendicular to impact surface 108. That is to say, the driving mechanism including gear assembly 110 and spring 106 coupled to mass 102 is configured to cause mass 102 to strike impact surface 108 so as to generate a recoil mode haptic effect.

According to the implementation shown in FIG. 1A, multi-mode haptic effects delivery system 100A is also configured to generate a vibrational mode haptic effect using activator 124 and vibration motor 122. For example, activator 124 may generate vibration activation signal 134b in response to an input to activator 124 by the user. Vibration activation signal 134b may cause vibration motor 122 to turn on and to generate a vibrational mode haptic effect, for example by rotating an unbalanced mass at one or more rotational frequencies.

Thus, in some implementations, as shown in FIG. 1A, vibration motor 122 may be configured to generate one or more vibrational mode haptic effects, while another motor, i.e., recoil motor 120 may be configured to power gear assembly 110 to generate one or more recoil mode haptic effects. It is noted that in some implementations, multi-mode haptic effect delivery system 100A may be configured to selectively generate one or the other of a vibrational mode haptic effect and a recoil mode haptic effect, but not both modes of haptic effects concurrently. However, in other implementations, multi-mode haptic effect delivery system 100A may be configured to generate a vibrational mode haptic effect and a recoil mode haptic effect substantially concurrently.

Figure 1B:
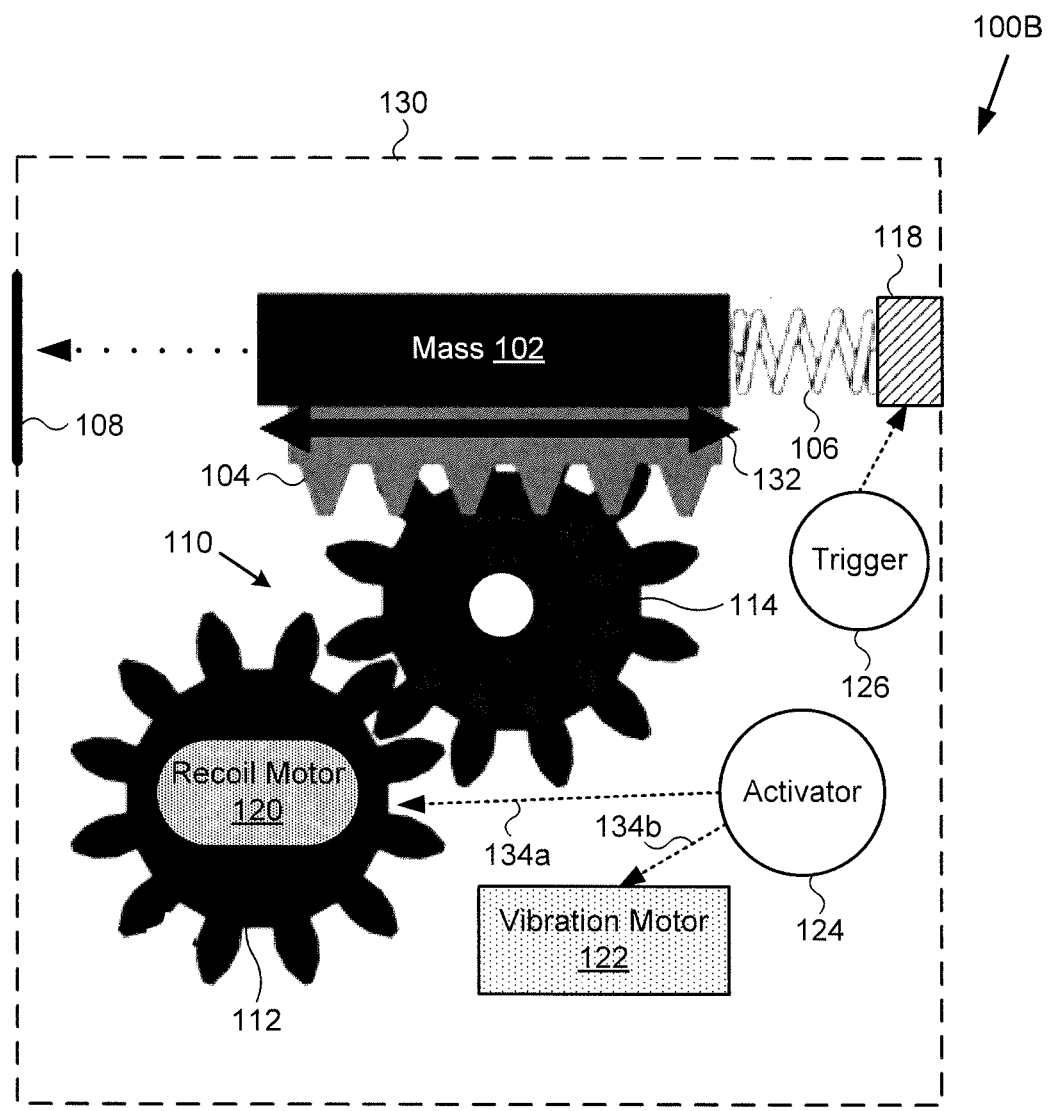
FIG. 1B shows a diagram of a variation to the exemplary multi-mode haptic effects delivery system of FIG. 1A, according to one implementation.

FIG. 1B shows a diagram of a variation to the exemplary multi-mode haptic effects delivery system of FIG. 1A, according to one implementation, as multi-mode haptic effects delivery system 100B. It is noted that any features in FIG. 1B identified using reference numbers identical to those shown in FIG. 1A correspond respectively to those previously described features, and may share any of the characteristics attributed to those corresponding features above.

As shown in FIG. 1B, in addition to the features included in multi-mode haptic effects delivery system 100A, in FIG. 1A, multi-mode haptic effects delivery system 100B also includes mass arresting mechanism 118 communicatively coupled to trigger 126. Mass arresting mechanism 118 is configured to hold mass 102 in place indefinitely after spring 106 is loaded. In various implementations, mass arresting mechanism 118 may be actuated mechanically, electrically, or magnetically. For instance, arresting mechanism 118 may comprise a mechanical latch, or an electromagnet, to name merely two examples.

According to the exemplary implementation shown in FIG. 1B, mass arresting mechanism 118 enables a controlled release of mass 102 in response to selection of trigger 126 by a user of multi-mode haptic effects delivery system 100B (system user not shown in FIG. 1B). For example, trigger 126, which may be implemented as a button or switch selectable by the user separately from activator 124, may cause mass arresting mechanism 118 to release mass 102 so as to generate a recoil mode haptic effect through impact surface 108.

Figure 2A:
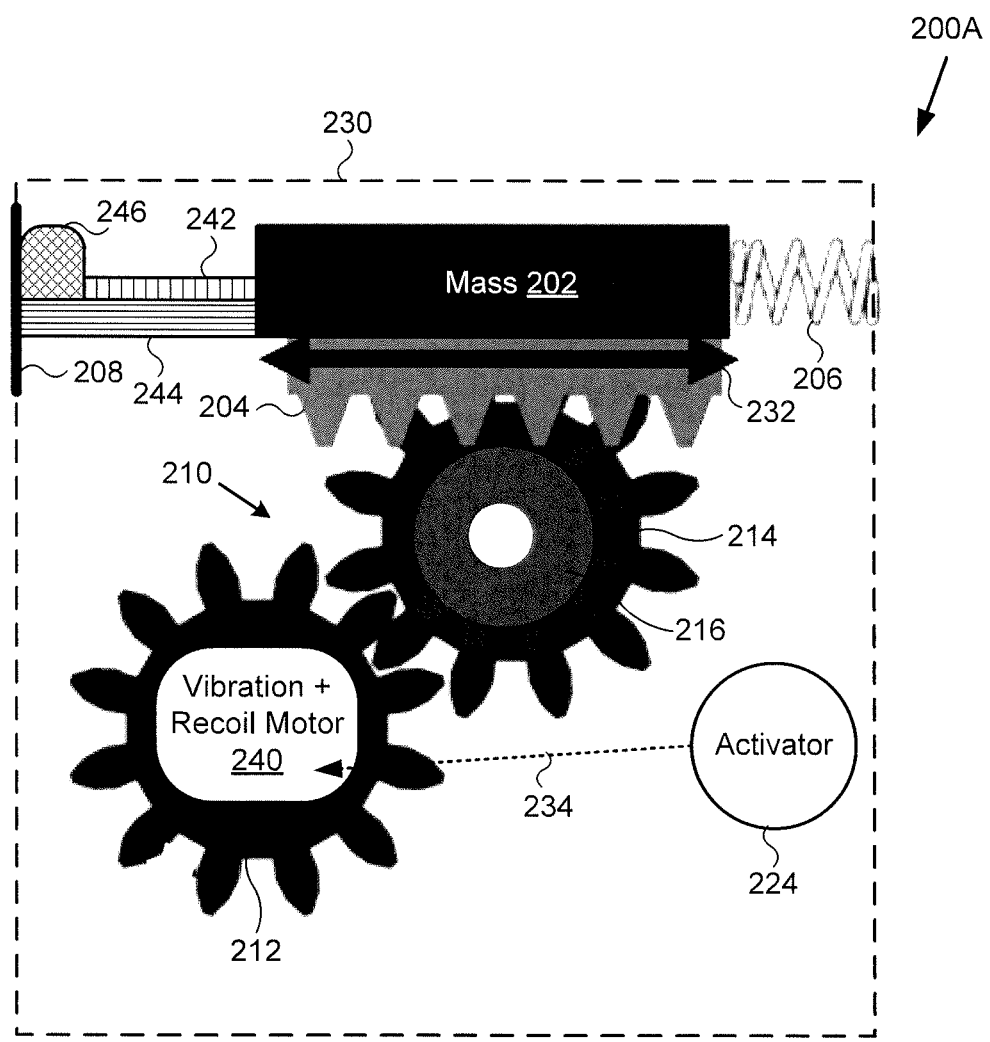
FIG. 2A shows a diagram of an exemplary multi-mode haptic effects delivery system, according to another implementation.

FIG. 2A shows a diagram of exemplary multi-mode haptic effects delivery system 200A, according to another implementation. As shown in FIG. 2A, multi-mode haptic effects delivery system 200A includes casing or enclosure 230 having impact surface 208 and containing mass 202 adjacent to impact surface 208. Mass 202 is shown to be situated on shuttle 204, which, in some implementations, may be configured to move with mass 202.

As further shown in FIG. 2A, enclosure 230 also contains a driving mechanism configured to reciprocate shuttle 204 and/or mass 202. According to the present exemplary implementation, that driving mechanism includes spring 206 coupled to mass 202, and gear assembly 210 for compressing spring 206 so as to load spring 206. Gear assembly 210 of the driving mechanism includes master gear 212 driven by vibration and recoil motor 240, and slave gear 214 driven by master gear 212. It is noted that slave gear 214 may include optional half gear 216. Also shown in FIG. 2A are activator 224 providing activation signal 234 to vibration and recoil motor 240, loading rail 242 and firing rail 244 for mass 202, and rail return mechanism 246.

Enclosure 230, mass 202, shuttle 204, spring 206, gear assembly 210, and activator 224 correspond respectively in general to enclosure 130, mass 102, shuttle 104, spring 106, gear assembly 110, and activator 124, in FIGS. 1A and 1B. In other words, enclosure 230, mass 202, shuttle 204, spring 206, gear assembly 210, and activator 224 may share any of the features or functionality attributed to respective enclosure 130, mass 102, shuttle 104, spring 106, gear assembly 110, and activator 124, by the present disclosure, and vice versa.

According to the implementation shown in FIG. 2A, multi-mode haptic effects delivery system 200A is configured to generate one or more recoil mode haptic effects and one or more vibrational mode haptic effects substantially concurrently using activator 224, vibration and recoil motor 240, the driving mechanism including gear assembly 210 and spring 206, and mass 202. For example, activator 224, which may be implemented as a button, switch, or trigger selectable by a user of multi-mode haptic effects delivery system 200A, may generate activation signal 234 in response to an input to activator 224 by the user (system user not shown in FIG. 2A).

Activation signal 234 may cause vibration and recoil motor 240, which may be a unidirectional motor, for example, to turn master gear 212 of gear assembly 210 in a counter-clockwise direction. That counter-clockwise turning of master gear 212 results in slave gear 214 including optional half gear 216 turning clockwise to move shuttle 204 carrying mass 202 on loading rail 242 away from impact surface 208 and toward spring 206, thereby compressing spring 206 so as to load spring 206.

According to the present exemplary implementation, shuttle 204 and/or mass 202 disengage from gear assembly 210 when spring 206 is loaded by transitioning from loading rail 242 to firing rail 244, resulting in mass 202 being impelled against impact surface 208 by spring 206 and then reciprocating along axis 232 substantially perpendicular to impact surface 208. That is to say, the driving mechanism including gear assembly 210 and spring 206 coupled to mass 202 is configured to cause mass 202 to strike impact surface 208 so as to generate a recoil mode haptic effect.

It is noted that, in addition to powering gear assembly 210, vibration and recoil motor 240 may be configured to concurrently rotate an unbalanced mass at one or more rotational frequencies to generate a vibrational mode haptic effect. That is to say, in some implementations, vibration and recoil motor 240 may have a vibration weight or mass attached thereto. Moreover, due to the transition of mass 202 from loading rail 242 to firing rail 244 prior to mass 202 striking impact surface 208, mass 202 may reciprocate while master gear 212, slave gear 214, and the vibration weight continue to rotate without damage to gear assembly 210 or shuttle 204.

Thus, in some implementations, as shown in FIG. 2A, multi-mode haptic effects delivery system 200A may include not more than one motor, i.e., consolidated vibration and recoil motor 240. Moreover, in those implementations, the same motor used to generate one or more vibrational mode haptic effects may be used to generate one or more recoil mode haptic effects. It is further noted that subsequent to mass 202 striking impact surface 208, rail return mechanism 246 may be utilized to transition shuttle 204 and/or mass 202 from firing rail 244 to loading rail 242. Rail return mechanism 246 may be implemented using a magnet, or an electro-mechanical device, for example.

Figure 2B:
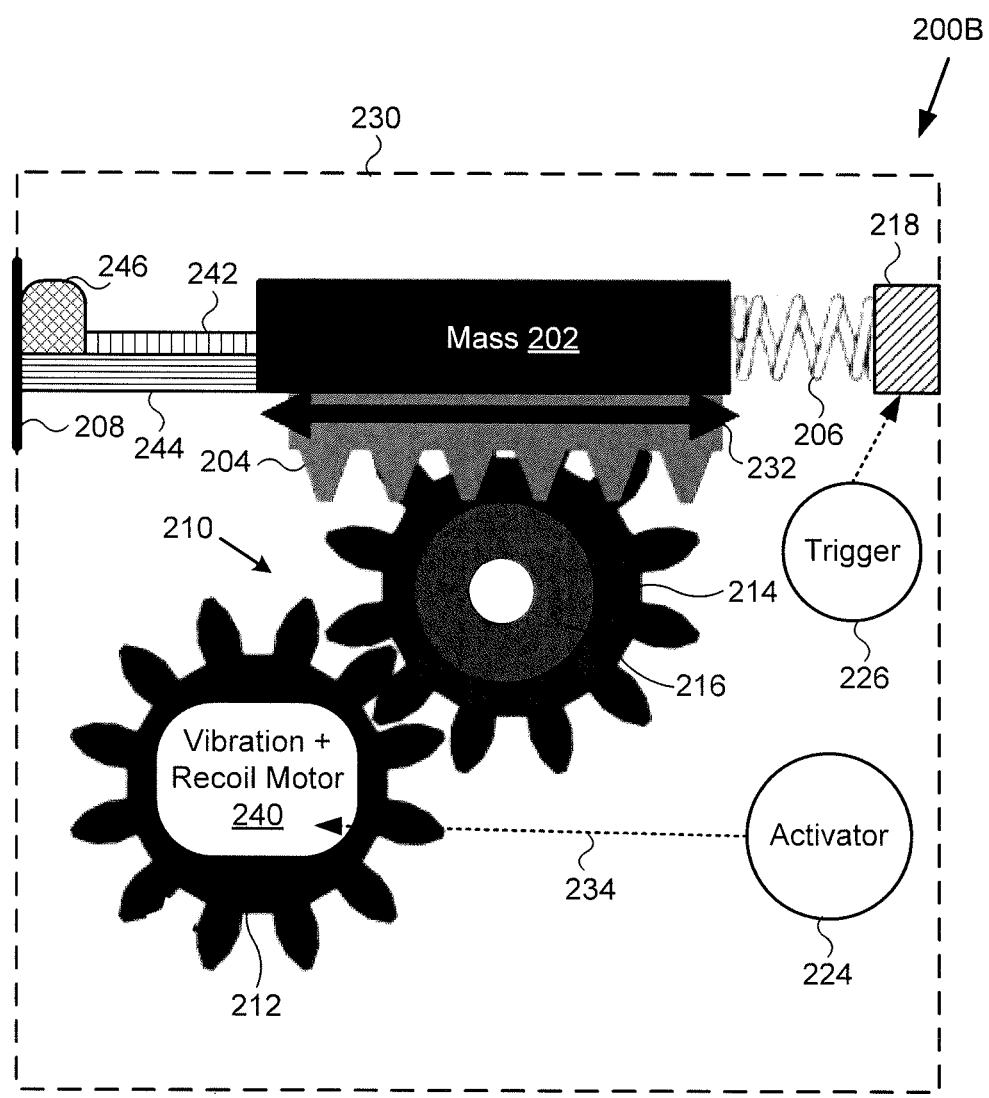
FIG. 2B shows a diagram of a variation to the exemplary multi-mode haptic effects delivery system of FIG. 2A, according to one implementation.

FIG. 2B shows a diagram of a variation to the exemplary multi-mode haptic effects delivery system of FIG. 2A, according to one implementation, as multi-mode haptic effects delivery system 200B. It is noted that any features in FIG. 2B identified using reference numbers identical to those shown in FIG. 2A correspond respectively to those previously described features, and may share any of the characteristics attributed to those corresponding features above.

As shown in FIG. 2B, in addition to the features included in multi-mode haptic effects delivery system 200A, in FIG. 2A, multi-mode haptic effects delivery system 200B also includes mass arresting mechanism 218 communicatively coupled to trigger 226. Mass arresting mechanism 218 is configured to hold mass 202 on firing rail 244 indefinitely after spring 206 is loaded and shuttle 204 and/or mass 202 transition from loading rail 242 to firing rail 244. In various implementations, mass arresting mechanism 218 may be actuated mechanically, electrically, or magnetically, for example.

According to the exemplary implementation shown in FIG. 2B, mass arresting mechanism 218 enables a controlled release of mass 202 in response to selection of trigger 226 by a user of multi-mode haptic effects delivery system 200B (system user not shown in FIG. 2B). For example, trigger 226, which may be implemented as a button or switch selectable by the user separately from activator 224, may cause mass arresting mechanism 218 to release mass 202 so as to generate a recoil mode haptic effect through impact surface 208.

Figure 3A:
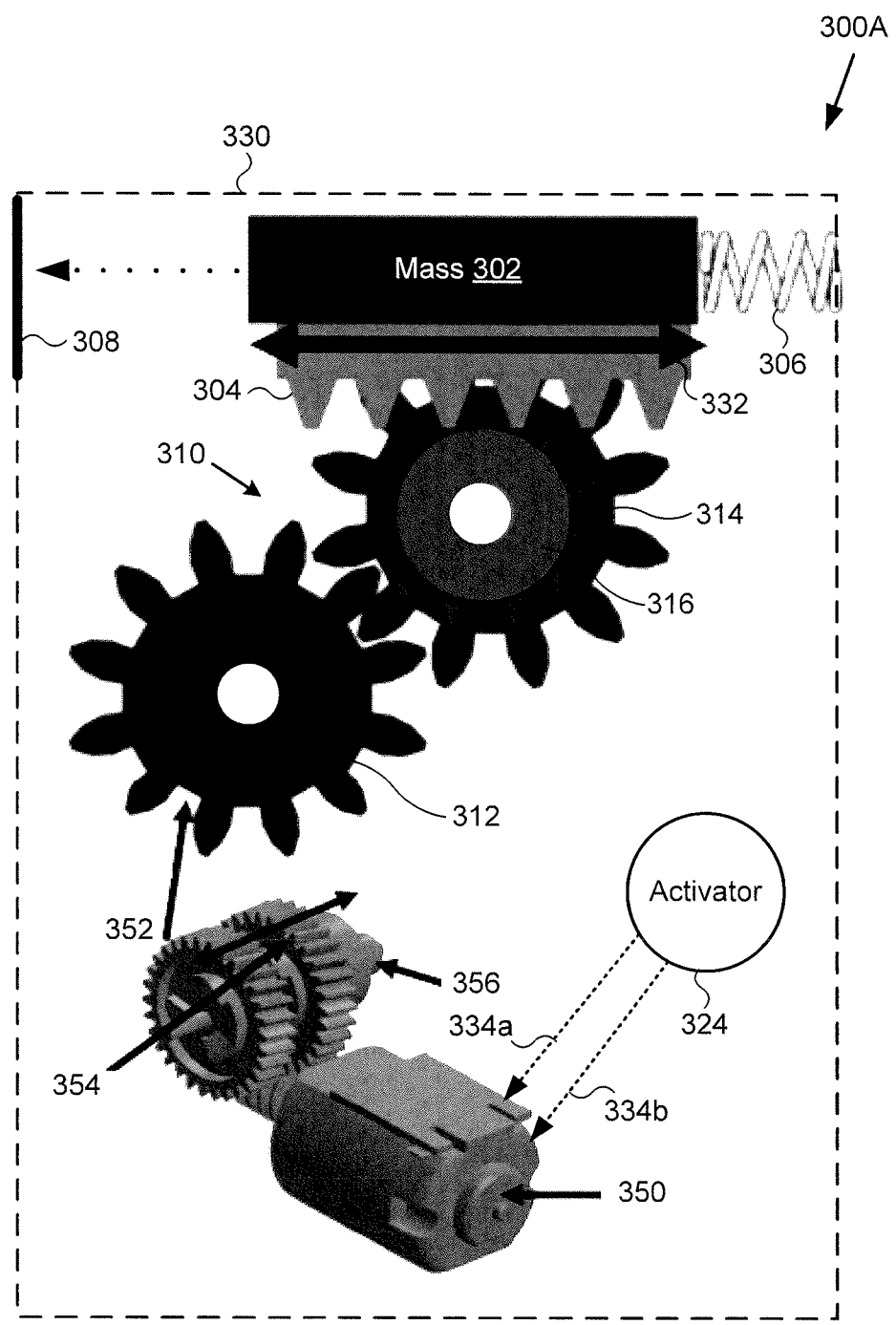
FIG. 3A shows a diagram of an exemplary multi-mode haptic effects delivery system, according to another implementation.

FIG. 3A shows a diagram of exemplary multi-mode haptic effects delivery system 300A, according to another implementation. As shown in FIG. 3A, multi-mode haptic effects delivery system 300A includes casing or enclosure 330 having impact surface 308 and containing mass 302 adjacent to impact surface 308. Mass 302 is shown to be situated on shuttle 304, which, in some implementations, may be configured to move with mass 302.

As further shown in FIG. 3A, enclosure 330 also contains a driving mechanism configured to reciprocate shuttle 304 and/or mass 302. According to the present exemplary implementation, that driving mechanism includes spring 306 coupled to mass 302, and gear assembly 310 for compressing spring 306 so as to load spring 306. Gear assembly 310 of the driving mechanism includes master gear 312 driven by recoil mode gear 352 of bidirectional motor 350, and slave gear 314 driven by master gear 312. It is noted that slave gear 314 includes half gear 316. Also shown in FIG. 3A are vibration mode gear 354 of bidirectional motor 350, vibration weight 356 attached to vibration mode gear 354, and activator 324 providing recoil activation signal 334a vibration activation signal 334b to bidirectional motor 350.

Enclosure 330, mass 302, shuttle 304, spring 306, gear assembly 310, and activator 324 correspond respectively in general to enclosure 130/230, mass 102/202, shuttle 104/204, spring 106/206, gear assembly 110/210, and activator 124/224, in FIGS. 1A, 1B, 2A, and 2B. In other words, enclosure 330, mass 302, shuttle 304, spring 306, gear assembly 310, and activator 324 may share any of the features or functionality attributed to respective enclosure 130/230, mass 102/202, shuttle 104/204, spring 106/206, gear assembly 110/210, and activator 124/224, by the present disclosure, and vice versa.

According to the implementation shown in FIG. 3A, multi-mode haptic effects delivery system 300A is configured to selectively generate one or more recoil mode haptic effects using activator 324, bidirectional motor 350 including recoil mode gear 352, the driving mechanism including gear assembly 310 and spring 306, and mass 302. For example, activator 324, which may be implemented as one or more buttons, and/or switches, and/or triggers selectable by a user of multi-mode haptic effects delivery system 300A, may generate recoil activation signal 334a in response to an input to activator 324 by the user (system user not shown in FIG. 3A).

Recoil activation signal 334a may cause bidirectional motor 350 to utilize recoil mode gear 352 to turn master gear 312 of gear assembly 310 in a counter-clockwise direction. That counter-clockwise turning of master gear 312 results in slave gear 314 including half gear 316 turning clockwise to move shuttle 304 carrying mass 302 away from impact surface 308 and toward spring 306, thereby compressing spring 306 so as to load spring 306.

After approximately one half turn of slave gear 314, half gear 316 may release shuttle 304, resulting in mass 302 being impelled against impact surface 308 by spring 306 and then reciprocating along axis 332 substantially perpendicular to impact surface 308. That is to say, the driving mechanism including gear assembly 310 and spring 306 coupled to mass 302 is configured to cause mass 302 to strike impact surface 308 so as to generate a recoil mode haptic effect.

According to the implementation shown in FIG. 3A, multi-mode haptic effects delivery system 300A is also configured to selectively generate a vibrational mode haptic effect using activator 324 and bidirectional motor 350 including vibration mode gear 354 with attached vibration weight 356. For example, activator 324 may generate vibration activation signal 334b in response to an input to activator 324 by the user. Vibration activation signal 334b may cause bidirectional motor 350 to utilize vibration mode gear 354 to generate a vibrational mode haptic effect, for example by rotating unbalanced vibration weight 356 in a clockwise direction, i.e., opposite the direction of rotation of recoil mode gear 352, at one or more rotational frequencies.

Thus, in some implementations, as shown in FIG. 3A, bidirectional motor 350 may be configured to selectively generate one or the other of a vibrational mode s haptic effect and a recoil mode haptic effect, but not both modes of haptic effects concurrently. Moreover, and as further shown in FIG. 3A, multi-mode haptic effect delivery system 300A may include not more than one motor, i.e., bidirectional motor 350. Consequently, the same motor used to generate one or more vibrational mode haptic effects may be advantageously used to also generate one or more recoil mode haptic effects.

Figure 3B:
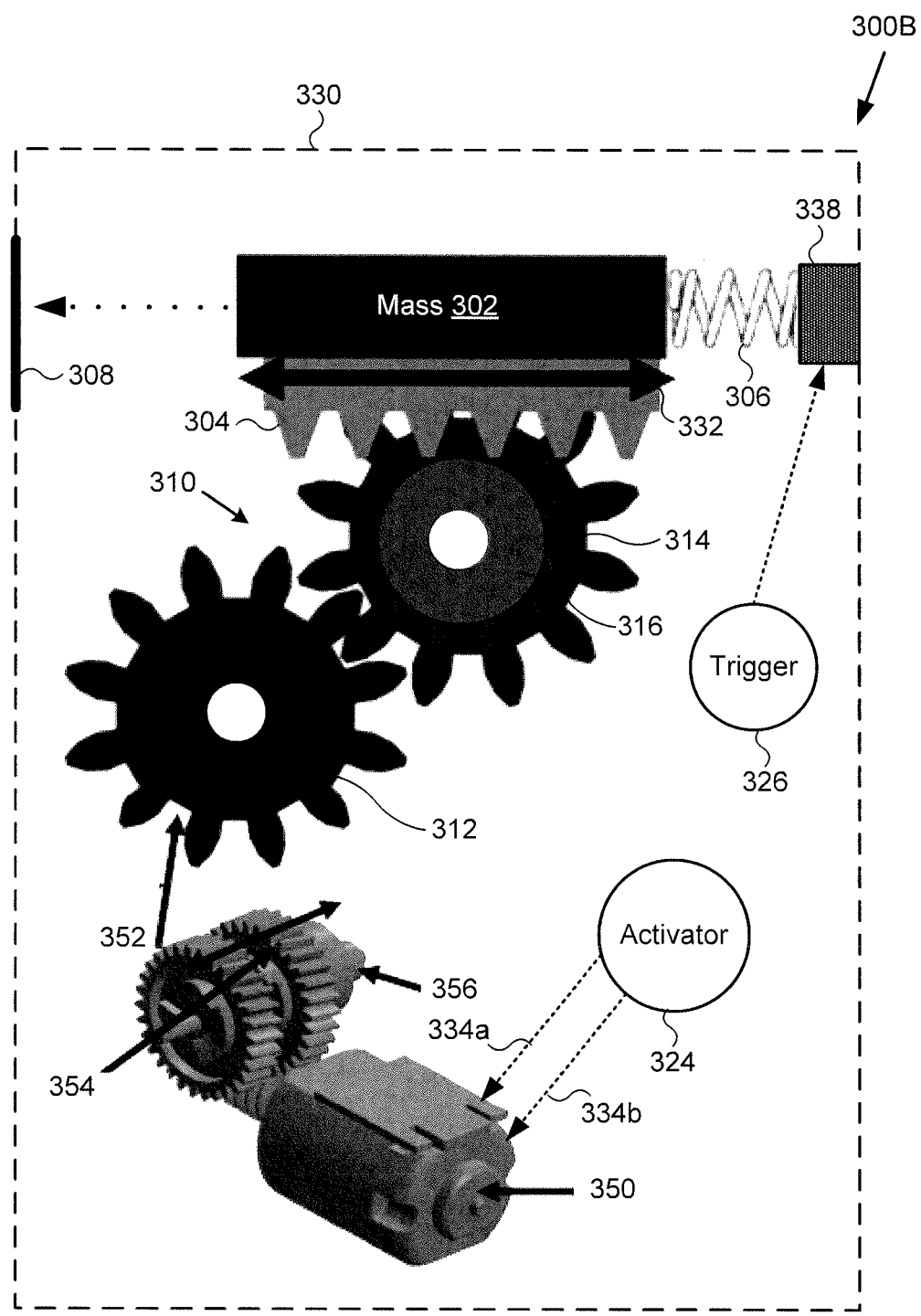
FIG. 3B shows a diagram of a variation to the exemplary multi-mode haptic effects delivery system of FIG. 3A, according to one implementation.

FIG. 3B shows a diagram of a variation to the exemplary multi-mode haptic effects delivery system of FIG. 3A, according to one implementation, as multi-mode haptic effects delivery system 300B. It is noted that any features in FIG. 3B identified using reference numbers identical to those shown in FIG. 3A correspond respectively to those previously described features, and may share any of the characteristics attributed to those corresponding features above.

As shown in FIG. 3B, in addition to the features included in multi-mode haptic effects delivery system 300A, in FIG. 3A, multi-mode haptic effects delivery system 300B also includes mass arresting and gear synchronization mechanism 338 communicatively coupled to trigger 326. Mass arresting and gear synchronization mechanism 338 is configured to hold mass 302 in place indefinitely after spring 306 is loaded by being compressed. In various implementations, mass arresting and gear synchronization mechanism 338 may be actuated mechanically, electrically, or magnetically. For instance, mass arresting and gear synchronization mechanism 338 may include a mechanical latch, or an electromagnet, to name merely two examples.

According to the exemplary implementation shown in FIG. 3B, mass arresting and gear synchronization mechanism 338 enables a controlled release of mass 302 in response to selection of trigger 326 by a user of multi-mode haptic effects delivery system 300B (system user not shown in FIG. 3B). For example, trigger 326, which may be implemented as a button or switch selectable by the user separately from activator 324, may cause mass arresting mechanism 318 to release mass 302 so as to generate a recoil mode haptic effect through impact surface 308. Mass arresting and gear synchronization mechanism 338 may also synchronize the position of shuttle 304 with slave gear 314 and/or half gear 316 to ensure that shuttle 304 may be reengaged with gear assembly 310 without damage to gear assembly 310 or shuttle 304.

Figure 4:
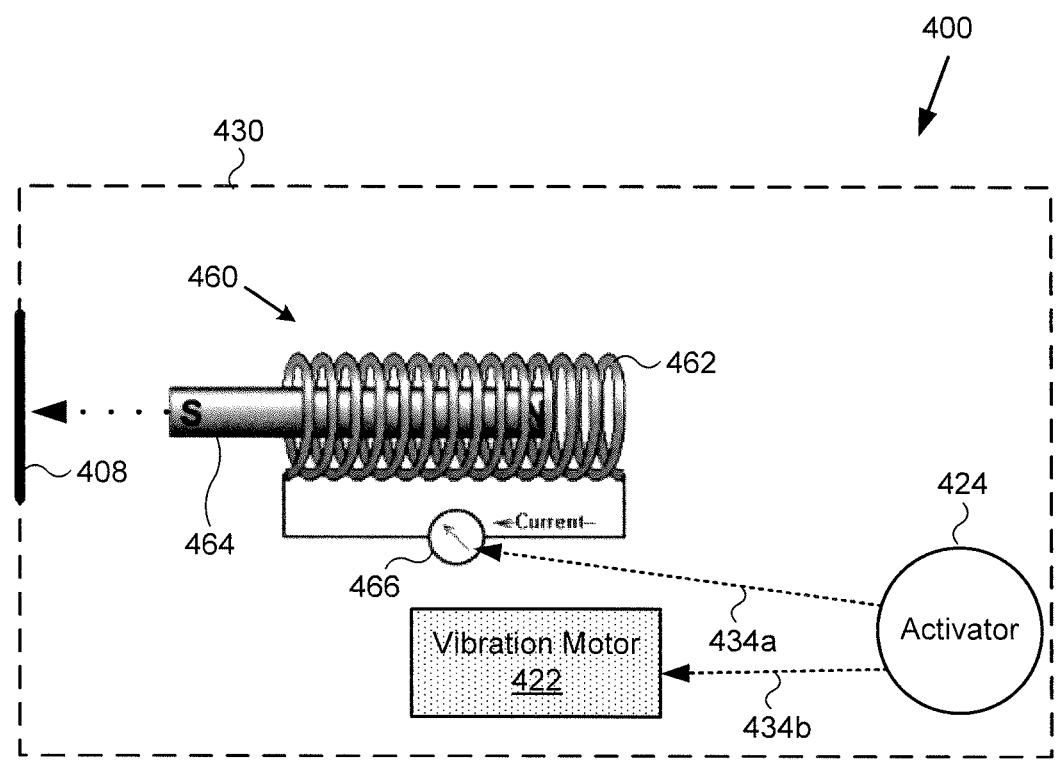
FIG. 4 shows a diagram of an exemplary multi-mode haptic effects delivery system, according to yet another implementation.

FIG. 4 shows a diagram of exemplary multi-mode haptic effects delivery system 400, according to yet another implementation. As shown in FIG. 4, multi-mode haptic effects delivery system 400 includes casing or enclosure 430 having impact surface 408 and containing ferrous mass 464 adjacent to impact surface 408. As further shown in FIG. 4, enclosure 430 also contains a driving mechanism configured to reciprocate ferrous mass 464. According to the present exemplary implementation, that driving mechanism is provided by solenoid 460 including inductive coil 462 coupled to current source 466. Also shown in FIG. 4 are vibration motor 422, and activator 424 providing recoil activation signal 434a to solenoid 460 and providing vibration activation signal 434b to vibration motor 422.

Enclosure 430 may be a portion of a toy weapon, or may be integrated with a wearable item such as a vest, jacket, or glove, for example. In one implementation, for instance, enclosure 430 may be integrated with a toy weapon by forming a portion of a gun stock configured to deliver a recoil mode haptic effect through impact surface 408 in contact with a user's hand or shoulder. Thus, in various implementations, enclosure 430 may be substantially rigid, or may be semi-rigid or pliable but include one or more rigid elements, such as impact surface 408.

According to the implementation shown in FIG. 4, multi-mode haptic effects delivery system 400 is configured to generate one or more recoil mode haptic effects using activator 424, solenoid 460, and ferrous mass 464. For example, activator 424, which may be implemented as one or more buttons, and/or switches, and/or triggers selectable by a user of multi-mode haptic effects delivery system 400, may generate recoil activation signal 434a in response to an input to activator 424 by the user (system user not shown in FIG. 4).

Recoil activation signal 434a may cause current source 466 to generate a current through inductive coil 462. For example, a current may be generated through inductive coil 462 causing ferrous mass 464 to be forced against impact surface 408. Moreover, varying the current through inductive coil 462 may cause ferrous mass 464 to reciprocate along an axis substantially concentric with inductive coil 462 and substantially perpendicular to impact surface 408. That is to say, the driving mechanism provided by solenoid 460 is configured to cause ferrous mass 464 to strike impact surface 408 so as to generate a recoil mode haptic effect.

According to the implementation shown in FIG. 4, multi-mode haptic effects delivery system 400 is also configured to generate one or more vibrational mode haptic effects using activator 424 and vibration motor 422. For example, activator 424 may generate vibration activation signal 434b in response to an input to activator 424 by the user. Vibration activation signal 434b may cause vibration motor 422 to turn on and to generate a vibrational mode haptic effect, for example by rotating an unbalanced mass at one or more rotational frequencies.

Thus, in some implementations, as shown in FIG. 4, vibration motor 422 may be configured to generate one or more vibrational mode haptic effects, while solenoid 460 and ferrous mass 464 are configured to generate one or more recoil mode haptic effects. It is noted that in some implementations, multi-mode haptic effect delivery system 400 may be configured to selectively generate one or the other of a vibrational mode haptic effect and a recoil mode haptic effect, but not both modes of haptic effects concurrently. However, in other implementations, multi-mode haptic effect delivery system 400 may be configured to generate a vibrational mode haptic effect and a recoil mode haptic effect substantially concurrently.

Thus, the present application discloses various implementations of a multi-mode haptic effects generation system. As described above, such a multi-mode haptic effects generation system includes a mass, a driving mechanism to reciprocate the mass, and a motor configured to generate vibrations. The disclosed system can generate recoil mode haptic effects, as well as vibrational mode haptic effects. In some implementations, the system disclosed by the present application can advantageously generate the multi-mode haptic effects concurrently. Moreover, in some implementations, the present system can advantageously generate recoil mode and vibrational mode haptic effects using a single motor.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A multi-mode haptic effects delivery system comprising:
   an impact surface;
   a mass adjacent to the impact surface:
   a driving mechanism configured to reciprocate the mass;
   a motor configured to generate a vibrational mode haptic effect;
   a trigger configured to be selected by a user; and
   an arresting mechanism communicatively coupled to the trigger, the arresting mechanism configured to prevent the mass from striking the impact surface until the trigger is selected by the user;
   wherein the driving mechanism is configured to cause the mass to strike the impact surface so as to generate a recoil mode haptic effect.

2. The multi-mode haptic effects delivery system of claim 1, wherein the driving mechanism comprises a spring coupled to the mass and a gear assembly for loading the spring.

3. The multi-mode haptic effects delivery system of claim 2, wherein the gear assembly is powered by another motor.

4. A multi-mode haptic effects delivery system comprising:
   an impact surface;

a mass adjacent to the impact surface:
a driving mechanism configured to reciprocate the mass;
a single motor configured to generate a vibrational mode haptic effect;
a trigger;
an arresting mechanism communicatively coupled to the trigger;
a spring coupled to the mass; and
a gear assembly for loading the spring;
wherein the driving mechanism is configured to cause the mass to strike the impact surface so as to generate a recoil mode haptic effect, wherein the gear assembly is also powered by the single motor, and wherein the arresting mechanism is configured to prevent the mass from striking the impact surface until the trigger is selected by a system user.

5. The multi-mode haptic effects delivery system of claim 4, wherein the single motor is a unidirectional motor.

6. The multi-mode haptic effects delivery system of claim 4, wherein the single motor is a bidirectional motor.

7. The multi-mode haptic effects delivery system of claim 6, wherein a haptic effect generated by the multi-mode haptic effects delivery system is a selectable one of the vibrational mode haptic effect or the recoil mode haptic effect.

8. The multi-mode haptic effects delivery system of claim 1, wherein the multi-mode haptic effects delivery system is configured to generate the vibrational mode haptic effect and the recoil mode haptic effect concurrently.

9. The multi-mode haptic effects delivery system of claim 1, wherein the driving mechanism for reciprocating the mass comprises a solenoid.

10. The multi-mode haptic effects delivery system of claim 1, wherein the multi-mode haptic effects delivery system is integrated with a toy weapon.

11. The multi-mode haptic effects delivery system of claim 1, wherein the multi-mode haptic effects delivery system is integrated with a wearable item.

12. A multi-mode haptic effects delivery system comprising:
an impact surface;
a mass adjacent to the impact surface:
a driving mechanism configured to reciprocate the mass;
a motor configured to generate a vibrational mode haptic effect;
a trigger configured to be selected by a user; and
an arresting mechanism communicatively coupled to the trigger, the arresting mechanism configured to prevent the mass from striking the impact surface until the trigger is selected by the user;
the motor further configured to power the driving mechanism for reciprocating the mass, thereby causing the mass to strike the impact surface so as to generate a recoil mode haptic effect.

13. The multi-mode haptic effects delivery system of claim 12, wherein the motor is a unidirectional motor.

14. A multi-mode haptic effects delivery system comprising:
an impact surface;
a mass adjacent to the impact surface:
a trigger;
an arresting mechanism communicatively coupled to the trigger, the arresting mechanism configured to prevent the mass from striking the impact surface until the trigger is selected by a system user;
a driving mechanism configured to reciprocate the mass; and
a bidirectional motor configured to generate a vibrational mode haptic effect, the bidirectional motor further configured to power the driving mechanism for reciprocating the mass, thereby causing the mass to strike the impact surface so as to generate a recoil mode haptic effect;
wherein a haptic effect generated by the multi-mode haptic effects delivery system is a selectable one of the vibrational mode haptic effect or the recoil mode haptic effect.

15. The multi-mode haptic effects delivery system of claim 12, wherein the multi-mode haptic effects delivery system is configured to generate the vibrational mode haptic effect and the recoil mode haptic effect concurrently.

16. The multi-mode haptic effects delivery system of claim 12, wherein the multi-mode haptic effects delivery system is integrated with a toy weapon.

17. The multi-mode haptic effects delivery system of claim 12, wherein the multi-mode haptic effects delivery system is integrated with a wearable item.

18. The multi-mode haptic effects delivery system of claim 12, wherein the driving mechanism comprises a spring coupled to the mass and a gear assembly for loading the spring, and wherein the multi-mode haptic effects delivery system comprises not more than one motor, the not more than one motor being the motor configured to generate the vibrational mode haptic effect, and wherein the gear assembly is also powered by the motor.

* * * * *